United States Patent
Hill et al.

[11] Patent Number: 6,089,818
[45] Date of Patent: Jul. 18, 2000

[54] TOWING LIFT ACCESSORY

[76] Inventors: Richard W. Hill; Mary Ann Hill, both of 54562 Benecia Trail, Yucca Valley, Calif. 92284

[21] Appl. No.: 09/173,188

[22] Filed: Oct. 14, 1998

[51] Int. Cl.[7] .................................................. B60P 3/12
[52] U.S. Cl. ............................................. 414/563; 280/402
[58] Field of Search ................................. 414/563, 607, 414/785; 410/56, 58, 64; 280/402, DIG. 14

[56] References Cited

U.S. PATENT DOCUMENTS

| | | |
|---|---|---|
| 2,553,229 | 5/1951 | Barhorst . |
| 2,719,730 | 10/1955 | Beck . |
| 3,659,873 | 5/1972 | Gewalt ................................ 414/563 X |
| 3,690,482 | 9/1972 | Gaumont . |
| 3,751,060 | 8/1973 | Holmberg et al. ...................... 280/402 |
| 3,767,069 | 10/1973 | White, Jr. et al. ...................... 414/563 |
| 3,881,619 | 5/1975 | Morris ................................... 414/607 |
| 4,049,146 | 9/1977 | Decker ................................... 414/607 |
| 4,111,452 | 9/1978 | Carlsson ............................. 414/607 X |
| 4,186,938 | 2/1980 | Youngblood . |
| 4,216,941 | 8/1980 | Little . |
| 4,265,463 | 5/1981 | Perruso . |
| 4,269,396 | 5/1981 | Easterwood . |
| 4,456,278 | 6/1984 | Chapman ............................ 414/563 X |
| 4,795,303 | 1/1989 | Bubik . |
| 4,838,754 | 6/1989 | Beliles et al. ........................ 414/563 X |
| 5,205,700 | 4/1993 | Lin et al. . |
| 5,297,911 | 3/1994 | Powell ................................ 414/607 X |
| 5,326,216 | 7/1994 | Russ . |
| 5,350,271 | 9/1994 | Weller . |
| 5,607,279 | 3/1997 | Hill et al. . |
| 5,984,614 | 11/1999 | Weber ................................ 414/563 X |

FOREIGN PATENT DOCUMENTS

| | | |
|---|---|---|
| 1772013 | 10/1992 | U.S.S.R. . |
| 1830014 | 7/1993 | U.S.S.R. . |

*Primary Examiner*—James W. Keenan
*Attorney, Agent, or Firm*—Sheldon & Mak

[57] ABSTRACT

A boom accessory for a tow truck having an underlift hoist includes a frame that is lockable onto the hoist by retraction of a ram of the hoist against the frame, the frame having an upwardly and rearwardly extending trailer coupling mount and a pivotally connected platform latch assembly for connecting a fifth-wheel trailer. In one version, the trailer coupling mount is interchangeable with a sheave mount for a sheave assembly by which a winch of the tow truck can hoist a load such as a disabled vehicle to be recovered. Also disclosed are a method for connecting a trailer to be towed, and a method for selectively hoisting a load or towing a fifth-wheel trailer as the load.

11 Claims, 1 Drawing Sheet

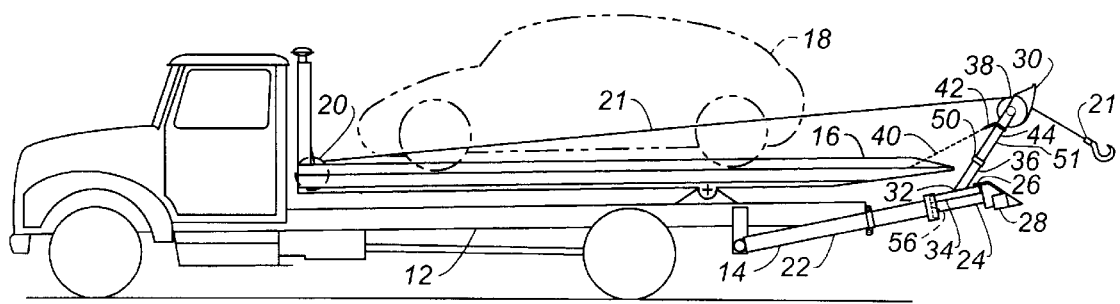
Fig. 1.
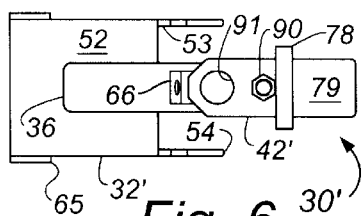
Fig. 6.
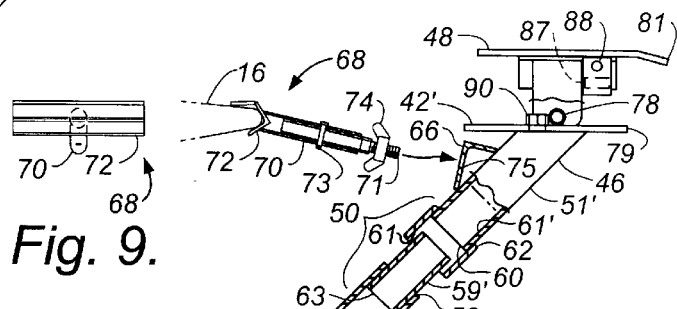
Fig. 9.
Fig. 2.
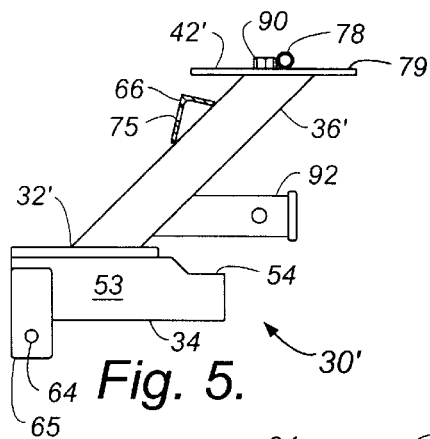
Fig. 5.
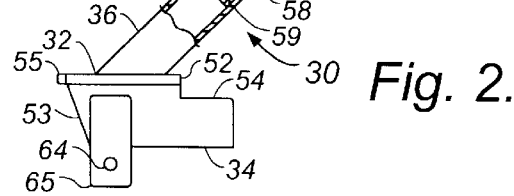
Fig. 3.
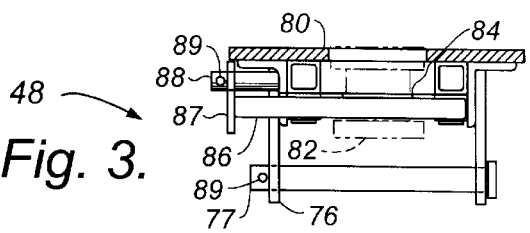
Fig. 4.
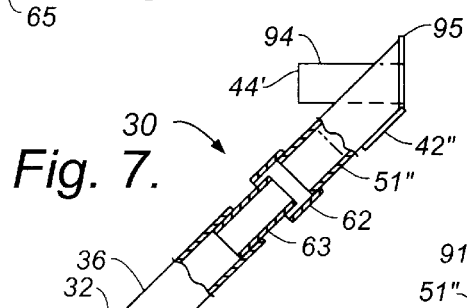
Fig. 7.
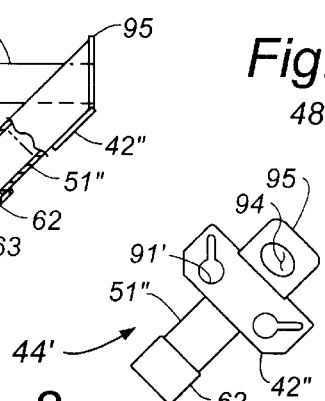
Fig. 8.
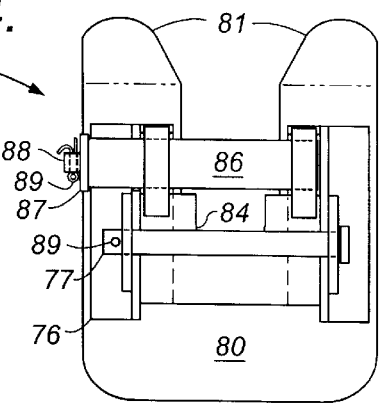

TOWING LIFT ACCESSORY

BACKGROUND

The present invention relates to recovery and towing vehicles, and more particularly to an attachable boom accessory for such vehicles.

A class of vehicles, commonly known as "tow trucks", includes traditional recovery vehicles having rear-mounted hoist booms for lifting and/or moving a disabled vehicle. In addition, there are more recently developed flatbed trucks that employ tilting and extension mechanisms for orienting a bed member as an inclined ramp for receiving a vehicle, the bed being moved to a horizontally oriented carrying position subsequent to receipt of the vehicle. The flatbed type truck is equipped with a cable winch that is located at or ahead of a front extremity of the bed for drawing the vehicle onto the bed. When the winch is required to move a vehicle from a relatively remote location (such as when retrieving a vehicle that has left the road), the bed and/or the cable is subject to becoming damaged as the cable is drawn forcibly over a rear extremity of the bed. Applicant's U.S. Pat. No. 5,607,279, which is incorporated herein by this reference, discloses a boom accessory that attaches to a hydraulic underlift that is commonly installed at the rear of flatbed tow trucks, the underlift having a wheel lift or "T-bar" connected thereto for towing a vehicle in addition to the load carried on the bed. (Underlifts are also installed on many recovery vehicles, and in cases of using underlifts to the exclusion of recovery booms, fixed recovery hoist booms are sometimes removed.) The patented boom accessory is locked in position by re traction of the underlift hoist, and include s a base for engaging a ram of the underlift hoist, and a boom member rigidly extending upwardly and rearwardly from the base for mounting a sheave that can movably support a winch hook cable of the truck, the base being configured for being in locked engagement with the ram when the ram is retracted against the base. A sleeve member extends within an end extremity of the boom member for receiving a sheave assembly stem. Optionally, a modular trailer hitch receptacle extends rearwardly from the boom member proximate the base The patented accessory has proven to be highly effective in many situations. However, it is not entirely satisfactory in some situations, for example, when it is desired to recover and transport trailers such as travel trailers and goose-neck trailers.

Accordingly, there is a need for an improved hoist boom and fifth-wheel trailer hitch accessory for tow trucks that is more effective in recovering and transporting different types of vehicles.

SUMMARY

The present invention meets this need by providing an improved boom and trailer hitch accessory that attaches to an underlift hoist of a tow truck, and being adapted for connecting trailers t o be towed. In one aspect of the invention, the accessory includes a base for engaging an underlift hoist ram of the truck, a boom member rigidly extending upwardly and rearwardly from the base and having a transversely oriented journal member fixedly mounted at an upper extremity thereof for pivotally connecting a "fifthwheel" trailer swivel platform, and means for holding the base in engagement with the ram when the ram is retracted against the base. The accessory can include a platform latch assembly, the platform latch assembly including a frame having a U-shaped platform member and a U-shaped retainer member in parallel-spaced relation below the platform member, and means for receiving a pin coupling to the journal member in spaced relation below the retainer member, a latch member being fixedly fastenable in coplanar relation with the retainer member for pivotally retaining a fifth-wheel stem of a trailer to be towed by the vehicle.

Preferably a stop member rearwardly extends from proximate the journal member for limiting rearwardly pivoting movement of the latch assembly. Preferably a threaded receptacle is rigidly connected proximate the journal member for fixedly holding a threaded hitch ball stem.

The base preferably includes a channel member having a web portion for engaging an upper side of the ram, opposite flange portions projecting downwardly on opposite sides of the ram. The base can include a pair of laterally spaced projections having respective openings for receiving a locking pin that is spaced below the web portion for enclosing a portion of the ram thereby to secure the base on the ram without the bas e having to be clamped between the head portion and the leg of the underlift. The head portion of the ram can have a forwardly extending projection, the base further including a rearwardly extending retainer portion for engaging an underside of the forwardly extending projection of the ram. The leg of the underlift can have a rearwardly extending cavity portion, the base further including a forwardly extending tongue portion for projecting into the cavity portion of the leg, the base being locked onto the underlift between the cavity of the leg and the projection of the head portion when the ram is retracted.

Preferably the boom member has a brace connection mounted thereto for stabilizing the boom member relative to the vehicle. Preferably the brace connection is formed having a generally forwardly facing brace engagement surface for abutting a brace extremity and a registration surface for registering the brace extremity. The accessory can further include a brace assembly having a column portion, a stem element axially projecting from one extremity of the column portion for engaging the registration surface, and a head portion for engaging the vehicle, the brace assembly blocking upward and forward movement of the frame relative to the underlift when the brace assembly is interposed between the vehicle and the brace engagement surface. The head portion of the brace assembly can be rigidly connected to the column portion, the head portion including a laterally extending channel for engaging a rearwardly facing edge portion of the vehicle, opposite end extremities of the channel stabilizing the head portion against the edge portion. The brace connection can further include an anchor plate fixedly mounted to the boom member and having an opening for connecting a tension member that extends between the anchor plate and the vehicle for holding the brace assembly interposed between the vehicle and the brace engagement surface.

In another aspect of the invention, a boom accessory for an emergency tow vehicle having a winch cable includes a boom member having a socket joint element at one end thereof; means for supporting the boom member with the socket joint element in upwardly and rearwardly projecting relation to the vehicle; a sheave mount having means for rotatably mounting a sheave thereon to movably support the winch cable; and a trailer coupling mount having means for pivotally connecting a trailer platform latch assembly, the sheave mount and the trailer coupling mount each having a socket element being interchangeably fixedly connectable to the socket joint element for forming a socket joint.

The socket joint element can include a non-circularly cylindrical socket engagement surface and a face surface, the sheave mount and the trailer coupling selectively slidably engaging the socket engagement surface and abutting the face surface. Preferably the socket joint includes an extension insert rigidly projecting from the boom member for selectively slidably engaging the sheave mount and the trailer coupling mount. Each of the sheave mount and the trailer coup ling mount can include a column extension having a shoulder surface for engaging the face surface, and a collar member rigidly projecting from the column extension and forming a cylindrical socket surface for engaging the socket engagement surface.

The sheave mount can include a boom extension having a non-circularly cylindrical socket surface for engaging the socket engagement surface and a shoulder surface for engaging the face surface; a circularly cylindrical sleeve member for receiving a stem portion of a sheave assembly; and an anchor member projecting from the boom extension for connecting tension elements to anchor points of the vehicle for stabilizing the column extension.

The boom accessory can be in combination with the sheave assembly, the sheave assembly further including a yoke member, a cable sheave rotatably mounted to the yoke member, the stem portion projecting from the yoke member in generally coplanar relation to the cable sheave. The sleeve member can have a sleeve axis, the socket engagement surface has a socket axis, the axes intersecting at an angle suitable for permitting the sleeve axis to be oriented approximately longitudinally relative to the vehicle when the sheave coupling is engaged with the boom. The sleeve member can extend within the column extension in coaxial relation to the socket engagement surface.

The trailer coupling mount can further include a boom extension having a non-circularly cylindrical socket engagement surface for engaging the socket surface and a shoulder surface for engaging the face surface; a journal for pivotally connecting a swivel platform; and an anchor member projecting from the boom extension for connecting a brace between the boom extension and the vehicle for stabilizing the boom extension. Preferably the trailer coupling further includes a threaded ball receiver rigidly connected to the boom extension for fixedly holding a threaded hitch ball stem. The trailer coupling can further include a stop member rigidly projecting rearwardly of the journal member for limiting rearward pivotal movement of the platform latch assembly.

Another aspect of the invention provides a method for connecting a trailer to be towed by a tow truck having an underlift pivotally connected beneath a rear extremity of the vehicle, the underlift having a rearwardly projecting ram for extending and retracting a T-bar or wheel lift, the ram axially projecting forwardly from a head portion thereof into a supporting leg member of the underlift, the method including the steps of:

(a) providing a boom accessory having a base and a boom member extending upwardly and rearwardly from the base;
(b) extending the ram;
(c) resting the base on the ram;
(d) retracting the ram for clamping the base between the head portion of the ram and the leg member;
(e) pivotally supporting a trailer platform latch assembly on the boom member, the latch assembly having a U-shaped platform, a U-shaped retainer spaced below the platform, and a latch member having a closed position for retaining a trailer stem;
(f) moving the latch member from the closed position;
(g) operating the underlift for obtaining a desired height of the latch assembly;
(h) moving the tow truck relative to the trailer for receiving the trailer stem into the U-shaped portions of the latch assembly;
(i) moving the latch member to the closed position; and
(j) operating the underlift for raising the trailer stem to an appropriate height for towing the trailer.

The step of operating the underlift for raising the trailer stem can include the further steps of:

(a) interposing a brace between the boom member and the tow truck; and
(b) compressively loading the brace for stabilizing the boom member relative to the tow truck.

In yet a further aspect of the invention, a method for moving a selected load by an existing vehicle having an elevated and rearwardly facing winch mounted thereto and having a cable for drawing a load, and an underlift pivotally connected beneath a rear extremity of the vehicle, the underlift having a rearwardly projecting ram for extending and retracting a T-bar or wheel lift, the ram axially projecting forwardly from a head portion thereof into a supporting leg member of the underlift, the method including the steps of:

(a) providing a boom accessory having a base and a boom member extending upwardly and rearwardly from the base, the boom member having a socket element at an upper extremity thereof for selectively connecting a sheave mount and a trailer coupling mount;
(b) extending the ram;
(c) resting the base on the ram;
(d) retracting the ram for clamping the base between the head portion of the ram and the leg member;
(e) selecting between a sheave assembly for hoisting the load and a trailer platform latch assembly for towing a fifth-wheel trailer as the load; and, when the sheave assembly is selected:

(f) supporting the sheave assembly by the sheave mount on the socket element;
(g) threading the cable over the sheave;
(h) connecting the cable to the load; and
(i) activating the winch for moving and hoisting the load, the cable being movably supported by the sheave; or, when the trailer latch assembly is selected:

(f) pivotally supporting the platform latch assembly relative to the socket element by the trailer coupling mount, the latch assembly having a U-shaped platform, a U-shaped retainer spaced below the platform, and a latch member having a closed position for retaining a trailer stem;
(g) moving the latch member from the closed position;
(h) operating the underlift for obtaining a desired height of the latch assembly;
(i) moving the vehicle relative to the trailer for receiving the trailer stem into the U-shaped portions of the latch assembly;
(j) moving the latch member to the closed position; and
(k) operating the underlift for raising the trailer stem to an appropriate height for towing the trailer.

DRAWINGS

These and other features, aspects, and advantages of the present invention will become better understood with reference to the following description, appended claims, and accompanying drawings, where:

FIG. 1 is a side elevational view of a flat bed tow truck having an underlift hoist, the truck being equipped with a hoist boom accessory according to the present invention;

FIG. 2 is a side elevational view of the accessory of FIG. 1 showing substitution of an interchangeable portion thereof;

FIG. 3 is a rear sectional view of a platform latch assembly of the interchangeable portion of FIG. 2;

FIG. 4 is a bottom plan view of the latch assembly of FIG. 3;

FIG. 5 is a side elevational view showing an alternative configuration of a boom unit of the accessory of FIG. 1;

FIG. 6 is a plan view of the boom unit of FIG. 3;

FIG. 7 is a partial side elevational view showing another alternative configuration of the boom unit of FIG. 2;

FIG. 8 is an oblique bottom view showing an anchor plate outline of an interchangeable module portion the boom unit of FIG. 2; and FIG. 9 is a detail front view showing a stabilizing brace portion of the accessory of FIG. 2.

DESCRIPTION

The present invention is directed to an improved boom accessory for towing and recovery vehicles, the accessory being particularly suitable for further extending the utility of such vehicles for transporting trailers and, optionally, recovering vehicles using a boom-mounted sheave. With reference to FIGS. 1–4, a flatbed tow truck 10 having a chassis 12 includes an underlift hoist 14 and tiltable, extendable bed 16 for receiving a first disabled vehicle 18. A winch unit 20 is mounted proximate a front extremity of the bed 15 and having a hook line 21 for advancing the vehicle 18 onto the bed 16 in a conventional manner. The underlift hoist 14 includes a leg member 22 that is vertically pivotable relative to the chassis 12, and a telescoping ram 24 that projects rearwardly from the leg member 22 for supporting a head member 26 of a T-bar/wheel lift 28 as shown in FIG. 1, by which a second disabled vehicle (not shown) is transportable by the tow truck 10.

A hoist boom apparatus 30 is selectively mountable on the underlift hoist 14 for facilitating acquisition of the disabled vehicle 18, and includes a frame 32 having a base 34 for engaging the ram 24, and a boom member 36 that projects upwardly and rearwardly from the base 34 for supporting a sheave assembly 38. The base 34 is configured for straddling the ram 24 when the ram 24 is sufficiently extended from the leg member 22, the frame 32 being locked relative to the leg member 22 when the ram 24 is subsequently retracted against the frame 32.

As further shown in FIG. 1, the frame 32 is braced by a pair of stabilizing members 40 that are connected between the bed 16 and an anchor member 42 that rigidly projects from proximate the sheave assembly 38. Further details of the locking connection of the frame 32 on the underlift hoist 14 and the stabilizing connections between the bed 16 and the boom apparatus 30 are described in the above-referenced patent.

According to the present invention, the boom apparatus 30 is adapted for selectively carrying a sheave mount 44 as shown in FIG. 1 to which the sheave assembly 38 is mountable, and a trailer coupling mount 46 to which a fifth-wheel platform latch assembly 48 is pivotally connectable as shown in FIG. 2. The anchor member 42 projects forwardly and downwardly from an upper extremity of the sheave mount 44 as further shown and described in the above-referenced patent. A counterpart of the anchor member, designated 42', is fixedly located on the trailer coupling mount 46 as shown in FIG. 2 for making the stabilizing connections when the trailer coupling mount 42 is substituted for the sheave mount 44. Interchangeable assembly of the sheave mount 44 and the trailer coupling mount 46 in the frame 32 is implemented by a socket joint 50 that axially connects a boom extension 51 of the mount 44 to the boom member 36 as indicated in FIG. 1 and shown in further detail in FIG. 2, the boom extension of the trailer connector mount 46 being designated 51'. It will be understood that the apparatus 30 can be supplied with either or both of the sheave mount 44 and the trailer coupling mount 46 in appropriate circumstances, and the sheave assembly 38 and/or the platform latch assembly 48 can be included with the apparatus 30 or provided separately.

In the exemplary configuration of the frame 32 as shown in FIG. 2, the base 34 is configured as a channel having a generally horizontally disposed web member 52 that extends between depending flange members 53, the flange members 53 being spaced sufficiently for clearing opposite sides of the ram 24, and having respective rear arm portions 54 that project rearwardly under a portion of the head member 26 for preventing a rear portion of the base 34 from lifting away from the ram 24. Also, a front extremity 55 of the base 34 projects forwardly into a leg cavity 56 of the underlift hoist 14, the engagement of the base 34 with the cavity 56 preventing a front portion of the base 34 from lifting away from the ram 24, the combination of the above-described engagements holding the frame 32 locked in position on the ram 24 when the ram 24 is retracted against the base 34. This and other configurations of the base 34 are further described on the above-referenced patent for use with variations of the underlift hoist 14.

The socket joint 50 is formed by the column member 36 having a face surface 58 and a cylindrical socket engagement surface 59, the trailer coupling mount 46 (and the sheave mount 44) having a shoulder surface 60 for abutting the face surface 58 and a socket surface 61 for axially slidably engaging the engagement surface 59. The boom member 36 can be formed of steel tubing, the socket engagement surface including a portion of the outside surface thereof. Similarly, the boom extension 51' of the coupling mount 46 (and the extension 51 of the sheave mount 44) has the shoulder surface 60 formed on an end extremity thereof, a collar member 62 rigidly attached to the boom extension, projecting beyond the shoulder surface 60, and having the socket surface 61 formed thereon. The socket surface 61 and the socket engagement surface 59 are preferably non-circular for preventing rotation of the coupling mount 46; accordingly, the boom member 36 and the boom extension 62 are formed of square tubing having a width and depth of approximately 3.0 inches and a wall thickness of 0.18 inch, the collar member 62 conforming to the outside of the boom extension 51' (or 51) so that the socket surface 61 is correspondingly non-circularly cylindrical. Herein the term "cylindrical" is defined generally as having a surface that is generated by a straight line that moves parallel to a fixed line. In a preferred exemplary configuration, the joint 50 further includes an extension insert 63 that rigidly projects from the boom member 36, forming a counterpart of the socket engagement surface, designated 59' for slidably engaging the inside of the boom extension 51' that forms a counterpart of the socket surface, designated 61'. Thus when the socket joint 50 includes the extension insert 63, the collar member 62 is optional.

As further shown in FIG. 2, an additional and preferred feature of the base 34 is a safety pin 64 that is removably supported by a pair of flange extensions 65, the flange extensions 65 extending below the flange portions 53, the pin 64 being located just slightly below the ram 24 when inserted through the flange extensions 65 following placement of the base 34 on the underlift hoist 14. Thus the frame 32 is positively retained on the hoist 14 regardless of whether the base 34 is clamped between the ram head member 26 and the leg member 22. Also, a brace receptacle 66 is rigidly mounted to the boom extension 51' for locating one end of a stabilizing brace 68 that can be interposed between the receptacle 66 and a rear extremity of the bed 16 or other suitable structure of the vehicle 10 for further stiffening the connection of the apparatus 30 to the underlift hoist 14, and for blocking upward movement of the hoist 14 itself.

The stabilizing brace 68 includes a telescopically adjustable column 70 having a threaded shank 71 projecting from one end thereof and a trough structure 72 rigidly mounted to the opposite end, the trough structure 72 projecting on opposite sides of the column 70 for engaging the rear extremity of the bed 16. The trough structure 72 can be formed of a length of structural steel channel or, as shown in FIGS. 2 and 9, a length of structural angle having a rectangular plate rigidly projecting from one leg thereof, opposite extremities of the trough structure 72 stabilizing the brace against the bed 16. Coarse adjustment of the length of the brace 68 is effected by selective engagement of a transverse pin 73 with the telescoping elements of the column 70, and fine adjustment being effected by a wing nut 74 that threadingly engages the shank 71, the nut 74 abutting the receptacle 66 with the shank 71 projecting into a registration opening 75 of the receptacle 66 when the brace 68 is in place. In use of the brace 68, the underlift is raised until the brace is compressively loaded between the receptacle 66 and the bed 16 (after appropriately adjusting the brace 68), then the tension members 40 are connected between the vehicle 10 and the anchor plate 42'. If necessary, the underlift 14 is then lowered slightly for tensioning the tension members 40, the wing nut 74 being finally tightened against the receptacle 66, thereby rigidly securing the connector mount 46 as well as the frame 32 relative to the vehicle 10. optionally, an additional jamb nut (not shown) can be threaded onto the shank 71 for locking the wing nut 74 in a desired position. Alternatively, the jamb nut can be located opposite the receptacle 66 from the wing nut 74 for securing the brace 68 in assembled relation thereto.

As best shown in FIGS. 3 and 4, the platform latch assembly 48 includes a platform structure 76 that is pivotally connected to the mount 46 by a coupling pin 77 that engages a tubular journal member 78 of the mount 46, the journal member 78 being rigidly connected to the anchor plate 42' in transverse relation thereto. Preferably, the anchor member 42' is elongated behind the journal member 78 for forming a stop member 79, the stop member limiting rearward pivoting of the latch assembly 48 when the trailer is not coupled to the boom apparatus 30.

The structure 76 includes a U-shaped platform member 80 having a spaced pair of ramp extremities 81 for slidably supporting a fifth-wheel trailer having a conventional coupling stem 82. A U-shaped retainer member 84 is spaced below the platform member 80, a latch member 86 being removably supported in coplanar relation to the retainer member 84 for pivotally retaining the stem 82, thereby to securely couple the trailer to the latch assembly 48. A latch plate 87 is rigidly attached to an end extremity of the latch member 86, the plate 87 serving as a handle for withdrawing the latch member 86 from the platform structure 76. Also, a stationary lock pin 88 of the structure 76 projects through the latch plate 87 for securing same using a suitable device such as a cotter pin 89, a counterpart of the cotter pin 89 also securing the coupling pin 77.

Preferably the trailer coupling mount 46 further includes a threaded ball receiver 90 that is rigidly mounted on the anchor plate 42' for holding a hitch ball in place of the latch assembly 48 when the trailer to be coupled is of the "goose-neck" or analogous type having a conventional ball-type hitch. The receiver 90 is positioned immediately ahead of the journal member 78, being located for permitting a stem of the hitch ball to extend into the boom extension 51', a suitable clearance opening being formed in the anchor plate 42'.

With further reference to FIGS. 5 and 6, an alternative configuration of the boom apparatus, designated 30', has a counterpart of the trailer coupling mount 46 integrally formed therewith, the anchor plate 42' being mounted to a counterpart of the boom member, designated 36'. The anchor plate 42' has a single relatively large anchor opening 91 formed therein for engaging hooks of the tension members 40 as described in the above-referenced patent. An optional but preferred feature of the apparatus 30 is a rearwardly extending hitch socket member 92 that forms a part of the frame 32 for receiving a conventional trailer hitch accessory (not shown) as further described in the above-referenced patent. The socket member 92 is shown in FIG. 5 as forming a part of the frame 32' of the apparatus 30'. It will be understood that the socket member 92 can be included in each of the configurations of FIGS. 1 and 2 as well as that of FIG. 7, described below.

With further reference to FIGS. 7 and 8, the apparatus 30 can include an alternative configuration of the sheave mount, designated 44', having a counterpart of the anchor plate, designated 42", that is mounted to the underside of a counterpart of the boom extension, designated 51". The anchor plate 42" has spaced apart counterparts of the anchor opening, designated 91', that are keyhole-shaped for selectively engaging links of the tension members 40 being formed by lengths of chain. The sheave mount 44' includes a sleeve member 94 for receiving a circularly cylindrical shank portion of the sheave assembly as described in the above-referenced patent, the sleeve member 94 being connected by a flange plate 95 to a free end extremity of the boom extension 51". In the configuration of FIGS. 7 and 8, the free end extremity of the boom extension 51 is beveled for orienting the sleeve member generally longitudinally relative to the vehicle 10 when the sheave mount 44' is engaged with the boom member 36 and the frame 32 is installed on the underlift hoist 14.

The frame 32 of FIG. 2 is configured with the front extremity 55 projecting as a tongue member for engaging the underlift hoist that has the cavity 56 only on top of the ram 24. In some cases, the engagement of the front extremity 55 with the cavity 56 advantageously restricts side-to-side tipping of the frame 32 relative to the underlift hoist 14. In some cases, the safety pin 64 is appropriately located with approximately 4.5 inches of clearance to the web member 52; in other cases, the appropriate clearance is approximately 5 inches. Similarly the flanges 53 can be spaced apart approximately 5.25 inches or other suitable distance, such as approximately 6.5 inches. The frame 32' of FIGS. 5 and 6 is similarly configured, but with the flange members 53 extending forwardly flush with the front of the web member 52. It will be understood that further forms and variations of the base 34 are appropriate for use with these and additional varieties of the underlift hoist 14.

Although the present invention has been described in considerable detail with reference to certain preferred versions thereof, other versions are possible. For example, the flange members 53 of the base 34 can be provided with inwardly facing protrusions for engaging the undersides of outwardly projecting flange portions of the ram. Alternatively, base 34 can be mounted to the vehicle 10 independently of the underlift hoist 14. Also, the socket joint 50 can include either or both of the collar member 62 and the extension insert 63, and the joint can be inverted. Further, the sheave assembly 38 can be permanently mounted to the sheave mount 44. Moreover, the frame 32, the sheave mount 44, and/or the trailer coupling mount 46 can be provided with rings or other attachments for connecting safety chains, etc. Therefore, the spirit and scope of the appended claims should not necessarily be limited to the description of the preferred versions contained herein.

What is claimed is:

1. A boom accessory for a tow truck having an underlift mounted beneath a rear extremity of the tow truck, the underlift having a rearwardly projecting ram for extending and retracting a t-bar or wheel lift, the ram axially projecting from a head portion thereof into a supporting leg portion of the underlift, the accessory comprising:
   (a) a base for engaging the ram for support thereby in rigid relation to the leg portion of the underlift;
   (b) a boom member rigidly projecting upwardly from the base;
   (c) a transversely oriented journal member mounted proximate a free extremity of the boom member; and
   (d) a trailer platform latch assembly comprising:
      (i) a frame having a U-shaped platform member and a U-shaped retainer member in parallel-spaced relation below the platform member;
      (ii) means for receiving a pin coupling pivotally connecting the frame to the journal member with the pin coupling being located in spaced relation below the retainer member; and
      (iii) means for fixedly fastening a latch member in coplanar relation with the retainer member for pivotally retaining a fifth-wheel stem of a trailer to be towed by the tow truck.

2. The boom accessory of claim 1, further comprising a stop member rearwardly extending from proximate the journal member for limiting rearwardly pivoting movement of the latch assembly.

3. The boom accessory of claim 1, further comprising a threaded receptacle rigidly connected proximate the journal member for fixedly holding a threaded hitch ball stem.

4. The boom accessory of claim 1, wherein the boom member has a brace connection mounted thereto for stabilizing the boom member relative to the tow truck.

5. The boom accessory of claim 4, wherein the brace connection is formed having a generally forwardly facing brace engagement surface for abutting a brace extremity and a registration surface for registering the brace extremity.

6. A boom accessory for a tow truck having an underlift mounted beneath a rear extremity of the tow truck, the underlift having a rearwardly projecting ram for extending and retracting a t-bar or wheel lift, the ram axially projecting from a head portion thereof into a supporting leg portion of the underlift, the accessory comprising:
   (a) a base for engaging the ram for support thereby in rigid relation to the leg portion of the underlift, the base comprising a channel member having a web portion for engaging an upper side of the ram and a spaced pair of flange portions projecting downwardly from the web portion on opposite sides of the ram when the base is on the ram, the base also including a pair of laterally spaced projections having respective openings for receiving a locking pin, the locking pin being spaced below the web portion for enclosing a portion of the ram thereby to secure the base on the ram without the base having to be clamped between the head portion and the leg portion of the underlift;
   (b) a boom member rigidly projecting upwardly from the base;
   (c) a transversely oriented journal member mounted proximate a free extremity of the boom member for pivotally connecting a trailer platform latch assembly.

7. The boom accessory of claim 6, wherein the head portion of the ram has a forwardly extending projection, the base further comprising a rearwardly extending retainer portion for engaging an underside of the forwardly extending projection of the ram.

8. The boom accessory of claim 7, wherein the leg portion of the underlift has a rearwardly extending cavity portion, and the base further comprises a forwardly extending tongue portion for projecting into the cavity portion of the leg portion when the base is on the ram, the base being locked onto the underlift between the cavity of the leg portion and the projection of the head portion when the ram is retracted.

9. A boom accessory for a tow truck having an underlift mounted beneath a rear extremity of the tow truck, the underlift having a rearwardly projecting ram for extending and retracting a t-bar or wheel lift, the ram axially projecting from a head portion thereof into a supporting leg portion of the underlift, the accessory comprising:
   (a) a base for engaging the ram for support thereby in rigid relation to the leg portion of the underlift;
   (b) a boom member rigidly projecting upwardly from the base, the boom member having a brace connection mounted thereto for stabilizing the boom member relative to the tow truck, the brace connection being formed having a generally forwardly facing brace engagement surface for abutting a brace extremity and a registration surface for registering the brace extremity;
   (c) a transversely oriented journal member mounted proximate a free extremity of the boom member for pivotally connecting a trailer platform latch assembly; and
   (d) a brace assembly having a column portion, a stem element axially projecting from one extremity of the column portion for engaging the registration surface, and a head portion for engaging the tow truck, the brace assembly blocking upward and forward movement of the frame relative to the underlift when the brace assembly is interposed between the tow truck and the brace engagement surface.

10. The boom accessory of claim 9, wherein the head portion of the brace assembly is rigidly connected to the column portion, the head portion including a laterally extending channel for engaging a rearwardly facing edge portion of the tow truck, opposite end extremities of the channel stabilizing the head portion against the edge portion when the brace assembly is interposed between the edge portion and the brace engagement surface.

11. A boom accessory for a tow truck having an underlift mounted beneath a rear extremity of the tow truck, the underlift having a rearwardly projecting ram for extending and retracting a t-bar or wheel lift, the ram axially projecting from a head portion thereof into a supporting leg portion of the underlift, the accessory comprising:

(a) a base for engaging the ram for support thereby in rigid relation to the leg portion of the underlift;

(b) a boom member rigidly projecting upwardly from the base, the boom member having a brace connection mounted thereto for stabilizing the boom member relative to the tow truck, the brace connection further comprising an anchor plate fixedly mounted to the boom member and having an opening for connecting a tension member, the tension member extending between the anchor plate and the tow truck for holding the brace assembly interposed between the tow truck and the brace engagement surface; and (c) a transversely oriented journal member mounted proximate a free extremity of the boom member for pivotally connecting a trailer platform latch assembly.

* * * * *